United States Patent
Hahn et al.

(10) Patent No.: US 11,341,128 B2
(45) Date of Patent: May 24, 2022

(54) POLY-LOGARITHMIC RANGE QUERIES ON ENCRYPTED DATA

(71) Applicant: SAP SE, Walldorf (DE)

(72) Inventors: Florian Hahn, Karlsruhe (DE); Florian Kerschbaum, Frankfurt am Main (DE)

(73) Assignee: SAP SE, Walldorf (DE)

( * ) Notice: Subject to any disclaimer, the term of this patent is extended or adjusted under 35 U.S.C. 154(b) by 1042 days.

(21) Appl. No.: 14/939,138

(22) Filed: Nov. 12, 2015

(65) Prior Publication Data

US 2017/0139985 A1     May 18, 2017

(51) Int. Cl.
*G06F 16/245*     (2019.01)
*G06F 16/22*     (2019.01)
(Continued)

(52) U.S. Cl.
CPC ........ *G06F 16/245* (2019.01); *G06F 16/2246* (2019.01); *G06F 16/9535* (2019.01); *G06F 21/6227* (2013.01)

(58) Field of Classification Search
CPC ........ G06F 17/30471; G06F 17/30501; G06F 17/30666; G06F 17/3087; G06F 17/3089; G06F 17/30893; G06F 17/30289; G06F 17/30477; G06F 17/30625; G06F 2221/2107; G06F 17/30327; G06F 17/30424; G06F 17/30; G06F 17/30595; G06F 17/30292; G06F 17/30312; G06F 17/30336; G06F 17/30457; G06F 17/3048; G06F 17/30961; G06F 16/284;
(Continued)

(56) References Cited

U.S. PATENT DOCUMENTS 7,395,437 B2    7/2008   Agrawal et al.
8,832,427 B2    9/2014   Roeder et al.
(Continued)

FOREIGN PATENT DOCUMENTS

| CN | 104408177 | 3/2015 |
|----|-----------|--------|
| CN | 104765848 | 7/2015 |
| EP | 2199935   | 6/2010 |

OTHER PUBLICATIONS

Communication and extended European Search Report from European Patent Office re Appl. No. 16002387.5-1870; dated Jan. 18, 2017; 6 pages.
(Continued)

*Primary Examiner* — Alford W Kindred
*Assistant Examiner* — Cecile H Vo
(74) *Attorney, Agent, or Firm* — Fish & Richardson P.C.

(57) ABSTRACT

Methods, systems, and computer-readable storage media for range queries over encrypted data include actions of receiving a range query token, determining one or more of whether a tree list of an encrypted search index is empty and a range of the token intersects with a range accounted of a tree in the tree list, the encrypted search index including the tree list and a point list, receiving encrypted query results based on one of a search tree, if the tree list is not empty and a range of the token is at least a sub-range of a range accounted for in the tree list, and the point list, if the tree list is empty or the range of the token is not at least a sub-range of a range accounted for in the tree list, and updating the encrypted search index based on the token.

20 Claims, 4 Drawing Sheets (51) Int. Cl.
  *G06F 16/9535* (2019.01)
  *G06F 21/62* (2013.01)
  *G06F 16/95* (2019.01)
(58) Field of Classification Search
  CPC ...... G06F 16/00; G06F 16/211; G06F 16/242;
    G06F 21/6209; G06F 21/6227; G06F
    16/2228; G06F 16/313; G06F 16/951;
    G06F 16/334; G06F 16/245; G06F
    16/2455; G06F 16/9032; G06F 16/2246;
    G06F 16/9535; H04L 9/0836; H04L
    2209/30
  USPC .. 707/E17.014, E17.032, E17.044, E17.017,
    707/E17.049, 705, 715, 728, 741, 758,
    707/999.003, 999.005, 999.1, E17.002,
    707/693, 999.107, 752, 803, 999.007,
    707/999.009, E17.039, 783, 999.002;
    713/189, 193, 165, 150, 190, 166
  See application file for complete search history.

(56) References Cited

U.S. PATENT DOCUMENTS

| | | | |
|---|---|---|---|
| 8,856,138 B1 | 10/2014 | Neubeck | |
| 2004/0243816 A1 | 12/2004 | Hacigumus et al. | |
| 2009/0171916 A1 | 7/2009 | Kirk et al. | |
| 2010/0106980 A1 | 4/2010 | Kerschbaum et al. | |
| 2012/0078914 A1* | 3/2012 | Roeder | H04L 9/008 707/741 |
| 2013/0046974 A1* | 2/2013 | Kamara | H04L 9/00 713/165 |
| 2013/0262852 A1* | 10/2013 | Roeder | G06F 21/602 713/150 |

OTHER PUBLICATIONS

Bijit Hore et al. "A Privacy-Preserving Index for Range Queries", Proceedings of the Thirtieth International Conference on Very Large Data Bases, Jan. 1, 2004, pp. 720-731, XP009133028.
Peng Wang et al. "Secure and Efficient Range Queries on Outsourced Databases Using Rp-trees", Data Engineering (ICDE), 2013 IEEE 29$^{th}$ International Conference on, IEEE, Apr. 8, 2013, pp. 314-325, XP032430875.
Agrawal et al. "Order Preserving Encryption for Numeric Data," In Proceedings of the 2004 ACM SIGMOD international conference on management of data, ACM, 2004, pp. 563-574.
Bellare et al., "Deterministic and Efficiently Searchable Encryption," In Proceedings of Crypto, 2007, 535-552.
Boldyreva et al., "Order-Preserving Symmetric Encryption," In Advances in Cryptology (Eurocrypt), 2009, 24 pages.
Boldyreva et al., "Order-Preserving Encryption Revisited: Improved Security Analysis and Alternative Solutions," Advances in Cryptology, Crypto 2011, Computer Science. Springer Berlin Heidelberg, 2011, 36 pages.
Boneh et al., "Public Key Encryption with keyword Search," In Advances in Cryptology—Eurocrypt 2004, pp. 506-522.
Boneh et al., "Functional Encryption: Definitions and Challenges," vol. 6597 of the series Lecture Notes in Computer Science, 2011, pp. 253-273.
Boneh et al., "Conjunctive, Subset, and Range Queries on Encrypted Data," S.P. Vadhan (Ed.): TCC 2007, LNCS 4392, pp. 535-554.
Cash et al., Highly-Scalable Searchable Symmetric Encryption with Support for Boolean Queries, Crypto 2013, Part I, LNCS 8042, 2013, pp. 353-373.
Chang et al., "Privacy Preserving Keyword Searches on Remote Encrypted Data," Applied Cryptography and Network Security, 2004, pp. 442-455.
Curtmola et al., "Searchable Symmetric Encryption: Improved Definitions and Efficient Constructions," In Proceedings of ACM CCS'06, 2006, 10 pages.
Goh, "Secure Indexes," Cryptology ePrint Archive Report 2003/216, 2003, 19 pages.
Golle et al., "Secure Conjunctive Keyword Search Over Encrypted Data," In Applied Cryptography and Network Security, ACNS 2004, LNCS 3089, 2004, pp. 31-45.
Guttman, "R-Trees: A Dynamic Index Structure for Spatial Searching," vol. 14. ACM, 1984, pp. 47-57.
Hacigumus et al., "Executing SQL over Encrypted Data in the Database-Service-Provider Model," In Proceedings of ACM SIGMOD'02, 2002, 12 pages.
Hore et al., "A Privacy-Preserving Index for Range Queries," In Proceedings of VLDB'04, 2004, 720-731.
Kamara et al., "Parallel and Dynamic Searchable Symmetric Encryption," In Financial Cryptography and Data Security, pp. 258-274.
Kamara et al., "Dynamic Searchable Symmetric Encryption," In Proceedings of the 2012 ACM conference on Computer and communications security, 2012, pp. 965-976.
Katz et al., "Predicate Encryption Supporting Disjunctions, Polynomial Equations, and Inner Products," In Advances in Cryptology—Eurocrypt 2008, pp. 146-162.
Lu, "Privacy-Preserving Logarithmic-Time Search on Encrypted Data in Cloud," In NDSS'11, Feb. 6, 2011, 15 pages.
Naveed et al., "Dynamic Searchable Encryption via Blind Storage," IEEE Symposium on Security and Privacy (SP), May 2014, pp. 639-654.
Popa et al., "CryptDB: Protecting Confidentiality with Encrypted Query Processing," In Proceedings of the 23rd ACM Symposium on Operating Systems Principles (SOSP), 2011, 16 pages.
Shen et al., "Predicate Privacy in Encryption Systems," In Theory of Cryptography, LNCS 5444, 2009, pp. 457-473.
Shi et al., "Multi-Dimensional Range Query Over Encrypted Data," In Security and Privacy, 2007. SP'07, IEEE Symposium on Security and Privacy, 2007, pp. 350-364.
Song et al., "Practical Techniques for Searches on Encrypted Data," In Proceedings of IEEE Symposium on Security and Privacy, 2000, 12 pages.
CN Office Action issued in Chinese Application No. 201610911555.0 dated Apr. 1, 2021, 16 pages (With English Translation).
Lu, "Privacy-preserving Logarithmic-time Search on Encrypted Data in Cloud." NDSS, Feb. 2012, 17 pages.

* cited by examiner

POLY-LOGARITHMIC RANGE QUERIES ON ENCRYPTED DATA

BACKGROUND

Encrypted databases provide data protection (security) in cloud platforms and/or database-as-a-service (DaaS) settings. In encrypted databases, data (plaintext) can be encrypted at the client to provide encrypted data (ciphertext), which can be provided to the database for storage. In some examples, a third-party provides and maintains the database. That is, the database is outsourced to the third-party. For example, a client encrypts data using one or more encryption keys to provide encrypted data, which the client sends to the third-party for storage in the database.

Outsourcing a database offers efficient resource management and low maintenance costs for clients, but exposes outsourced data (client data) to a service provider (the third-party providing the database and its agents). For example, privacy-preserving range queries allow encrypting data, while still enabling tests on ciphertexts, if their corresponding plaintexts fall within a requested range. This provides a data owner the possibility to outsource data collections to a cloud service provider without sacrificing privacy nor losing functionality of filtering the data. However, current schemes for handling range queries either leak additional information (e.g., ordering of the complete data set), or significantly slow the search process.

SUMMARY

Implementations of the present disclosure include computer-implemented methods for poly-logarithmic range queries on encrypted data stored in a database on a server. In some implementations, actions include receiving, by a server-side computing device, a range query token from a client-side computing device, determining, by the server-side computing device, one or more of whether a tree list of an encrypted search index is empty and a range of the range query token is intersecting with a range accounted by at least one tree in the tree list, the encrypted search index including the tree list and a point list, receiving, by the server-side computing device, encrypted query results based on one of a search tree, if the tree list is not empty and a range of the range query token is at least a sub-range of a range accounted for in the tree list, and the point list, if the tree list is empty or the range of the range query token is not at least a sub-range of a range accounted for in the tree list, and updating, by the server-side computing device, the encrypted search index based on the range query token and a client-server protocol. Other implementations of this aspect include corresponding systems, apparatus, and computer programs, configured to perform the actions of the methods, encoded on computer storage devices.

These and other implementations can each optionally include one or more of the following features: updating the encrypted search index includes refining a search tree of the tree list at least partially based on transmitting the range query token and a previously received range query token to the client-side computing device, and receiving refined range tokens from the client-side computing device, the encrypted search index being updated based on the refined range tokens; updating the encrypted search index includes extending a search tree of the tree list to provide an extended search tree at least partially based on transmitting a root node of the search tree and a previously received query corresponding to the search tree to the client-side computing device to provide a new range query token corresponding to the extended search tree; updating the encrypted search index includes merging multiple search trees of the tree list to provide a merged search tree at least partially based on transmitting respective root nodes of the multiple search trees to the client-side computing device, and receiving a revised token corresponding to the merged search tree; the multiple trees are merged in response to determining that there is no value gap between the multiple trees; actions further include receiving the encrypted search index and ciphertext from the client-side computing device; and the tree list includes at least one search tree based on a previously received range query token.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for poly-logarithmic range queries on encrypted data stored in a database on a server. More particularly, implementations of the present disclosure enable range queries requested from a client (e.g., data owner) to be compared on a server-side (e.g., hosted database). In this manner, the service provider can use information gained from previously queried ranges to speed-up search time for subsequent range queries. In some implementations, values that have fallen within a queried range are stored in an interactively built search index for subsequent range requests. In some implementations, values that have not been queried before do not leak any information to the cloud service provider and stay perfectly secure. As discussed in further detail herein, implementations of the present disclosure reduces information leakage while supporting poly-logarithmic search time on average.

Figure 1:
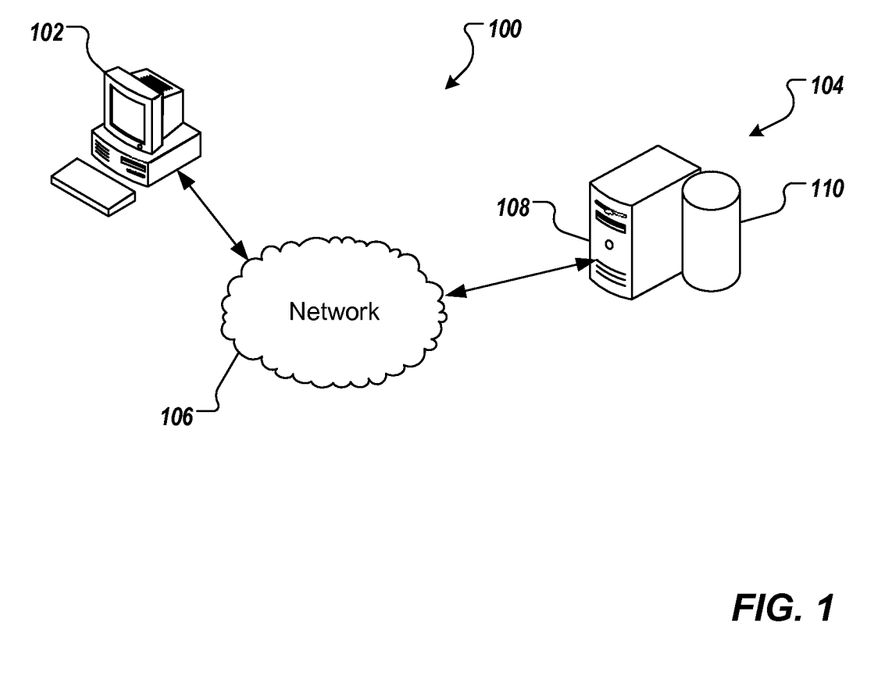
FIG. 1 depicts an example high-level architecture in accordance with implementations of the present disclosure.

FIG. 1 depicts an example high-level architecture 100 in accordance with implementations of the present disclosure. The high-level architecture 100 includes a computing device 102 (e.g., client-side), a server system 104, and a network 106. In some examples, the computing device 102 and the server system 104 communicate over the network 106. In some examples, the computing device 102 can communicate with the server system 104 over one or more networks (e.g., including the network 106). In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server system 104 includes at least one server device 108 and at least one data store 110. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the computing device 102) over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server system 104 maintains a database that stores encrypted data (e.g., an encrypted database). In some examples, the data (plaintext) is encrypted at the computing device 102 (client-side), and the encrypted data (ciphertext) is sent to the server system 104 over the network 106 for storage. In some implementations, and as described herein, the server system 104 can be provided by a third-party service provider, which stores and provides access to the encrypted data.

In some implementations, a database is part of a database system that also includes a query execution engine. In some examples, the query execution engine receives a query (e.g., a search token from a client), provides a query plan based on the query, executes the query plan to provide a response (e.g., encrypted data from the database that is responsive to the query), and transmits the response to the client (e.g., from which the query was received). In some examples, the query plan includes one or more operations to be performed on the encrypted data.

Implementations of the present disclosure are described with reference to the example context of outsourcing data to a cloud service provider (e.g., database on the cloud). Cloud computing enables a data owner to outsource data, while enabling the data owner to access the data using one or more computing devices. For example, even computing devices with limited computation power (e.g., a smartphone, relative to a desktop computer) can be used to access relatively large data collections. This is possible by delegating computationally expensive operations (e.g., searching) to the cloud service provider. In some examples, a relatively small subset of data matching a search query is transmitted to and processed by the client-side computing device.

To preserve data privacy, the outsourced data is encrypted. For example, the data (plaintext) is encrypted at the client-side to provide encrypted data (ciphertext), which is transmitted to and stored at the server-side. In some examples, standard encryption schemes are not suitable for the data outsourcing scenario, because they do not enable processing of encrypted data. As a result, the complete encrypted data would need to be transferred to the client-side computing device, and decrypted and processed locally.

Advanced encryption schemes enable a server-side computing device (of the cloud service provider) to perform search operations, such as exact pattern matching and/or range queries on ciphertexts, for example. In some examples, the data owner can encrypt the data and augment the encrypted data with additional information (e.g., keywords, timestamps). The data owner transfers the ciphertexts to the cloud service provider. Using a secret key (e.g., an encryption key known only to the data owner), the data owner can create a search token (e.g., for exact pattern matching of a keyword, a range the timestamp should fall within), which is transmitted to the cloud service provider. Using this search token, the cloud service provider can filter the encrypted data for all ciphertexts that match with the search token, and can return matching ciphertexts to the data owner.

To be practical, searchable encryption schemes should be efficient and secure. In some examples, search operations should be possible in sub-linear search time, which can be achieved by an appropriately encrypted search index. In order to protect privacy of outsourced data, the encrypted data and the encrypted search index should leak as little information as possible. For example, ciphertexts that have never been searched for should not unveil any information.

In view of this, implementations of the present disclosure provide an encrypted search scheme for implementing privacy-preserving range queries on encrypted data. In accordance with the present disclosure, and as described in further detail herein, implementations enable the cloud service provider to compare range tokens that have already been queried in previous search requests. This enables the cloud service provider to decrease its average search time for range queries. While initial search time for a range query is linear in the number of indexed ciphertexts (e.g., files), subsequent queries can be accelerated. For example: in a first, initial search, the cloud service provider learns the result set of a range query; given a range query in a second search request that is a subrange of the already queried range in the first step, it is sufficient to scan the previously learned result set. In this manner, the search space of the second query is downscaled, which results in a quicker search operation. Furthermore, using this approach for every new range query, the cloud service provider can construct and refine an encrypted search index in an interactive protocol between the client and the server, as described herein. Consequently, the encrypted search scheme of the present disclosure achieves decreased search time on average. In addition, ciphertexts that have never fallen within any queried range are not contained in any access pattern. Consequently, using a suitable encryption scheme, the un-queried ciphertexts do not leak any information.

In some implementations, properties of the encrypted search scheme for privacy-preserving range queries can be summarized with respect to security, efficiency, and modularity. Security is formalized using a simulation-based approach in a non-adaptive model. In some examples, leakage functions are provided that give an upper bound for information that is leaked by the encrypted search scheme of the present disclosure. With respect to efficiency, the encrypted search scheme has amortized poly-logarithmic runtime. This is achieved by interactively building a search index. With respect to modularity, the encrypted search scheme is built on a black box interface for functional encryption.

To provide further context for implementations of the present disclosure, governing definitions are provided. In some examples, $\mathbb{N}$ denotes the set of natural numbers, and $[i,j]$ is denoted with $i \leq j$ and $i,j \in \mathbb{N}$ as the set of integers starting at i and including j (i.e., the set $\{i, \ldots, j\}$). An output z of a (possible probabilistic) algorithm $\mathcal{A}$ is written as $z \leftarrow \mathcal{A}$. In some examples, $\lambda$ denotes a security parameter. A function $f: \mathbb{N} \rightarrow \mathbb{R}$ is called negligible (in x), if, for every positive polynomial $p(\cdot)$ there exists a $x_0$, such that, for all $x > x_0$, it holds that $f(x) < 1/p(x)$. Given a matrix M, M[i] denotes the i-th line, and M[i][j] denotes the j-th element in the i-th line. A message m is provided as a tuple $(f, v)$, where $f$ is an arbitrary file (e.g., a document, an image), and a value point $v$, which is used for indexing. In some examples, each message m has a unique identifier ID(m), and each file $f$ can be accessed given the associated identifier ID(m). For range $Q=[q^{(s)}, q^{(e)}]$, $ID_Q$ can be defined as the set of file identifiers indexed under values v with $v \in Q$ (i.e., $ID_Q = \{ID(m): m=(f, v) \text{ with } q^{(s)} \leq v \leq q^{(e)}\}$).

In some implementations, the scheme for secure and efficient range queries is composed of the following (partly probabilistic) polynomial-time algorithms: SRQ-Setup, SRQ-Enc, SRQ-IndexFile, SRQ-Token, SRQ-Search. In an initial step, the data owner creates public parameters and a master key for a desired value domain by running SRQ-Setup. In some examples, the public parameters are known by all parties. In a next step, a message collection (plaintext) is encrypted and indexed under given value points by running SRQ-Enc. In some examples, each value point lies in the value domain used in the initial setup. The result of these steps includes an encrypted index and a ciphertext collection, which are transferred to the server-side (e.g., cloud service provider) using SRQ-IndexFile. The data owner (holding the master key mk) is able to create range tokens (for respective range queries) by calling SRQ-Token. A range token can be transmitted to the server-side, such that the respective range query can be executed over encrypted data. In some examples, given a range token, the server can run SRQ-Search to filter all (encrypted and indexed) messages associated with value points falling within the requested range.

Definition 1: The scheme SRQ for secure range queries includes the following (probabilistic) polynomial time algorithms:
- mk←SRQ-Setup $(1^\lambda, [0, D-1])$: is a probabilistic algorithm that takes a security parameter $1^\lambda$ and value domain $[0, D-1]$ as input and outputs a master key mk.
- c←SRQ-Enc(mk, m): is a probabilistic algorithm that takes a master key mk and message m as input. Message m is a tuple $m=(f, v)$ of file $f$ and value point $v \in [0, D-1]$. A ciphertext c is output.
- $\gamma'$, C'←SRQ-IndexFile(ID(m), c, $\gamma$, C): is a deterministic algorithm that takes an identifier ID(m), a ciphertext c, a search index $\gamma$, and a ciphertext collection C as input.

An updated secure search index $\gamma'$ and an updated ciphertext collection C' are output.
- $\tau_Q$←SRQ-Token (mk, Q): is a probabilistic algorithm that takes master key mk and range $[q^{(s)}, q^{(e)}]=Q \subseteq [0, D-1]$ as input and outputs a search token $\tau_Q$ for range Q.
- $ID_Q$←SRQ-Search ($\tau_Q$, $\gamma$): is a deterministic algorithm that takes a range token $\tau_Q$ for range Q and search index $\gamma$ as input, and outputs $ID_Q$.

In some implementations, an order-preserving encryption scheme can be used. For example:

OPE=(OPE-Setup,OPE-Enc,OPE-Dec), where

OPE-Enc(x)≤OPE-Enc(y) $\Leftrightarrow$ x≤y.

This example OPE scheme can be used for building an encrypted search index. For example, in each message $m=(f, v)$, the value point v is encrypted using OPE-Enc, and is associated with the message identifier ID (m). All index entries of the form $c_i=(OPE\text{-}Enc(v_i), ID(m_i))$ are sorted according to their first element. For search queries for range $[q^{(s)}, q^{(e)}]$ a range token is implemented as a tuple $\tau_Q=(OPE\text{-}Enc(q^{(s)}), OPE\text{-}Enc(q^{(e)}))$. Given $\tau_Q$ to the server storing the search index, the server-side is able to obtain the set $\{(OPE\text{-}Enc(v_i), ID(m_i)): OPE\text{-}Enc(q^{(s)}) \leq OPE\text{-}Enc(v_i) \leq OPE\text{-}Enc(q^{(e)})\}$ in logarithmic time by running binary search. However, even indexed, but not queried points can be compared with all other indexed (queried and not queried) points.

In another example approach to hide the information about the order of all points not queried before, range predicate encryption (RPE) can be used. An example RPE scheme includes the following example algorithms:
- k←RPE-Setup($1^\lambda$, [0, D−1]) on input of a security parameter V and a domain range [0, D−1] outputs a key k.
- c←RPE-Enc(k, $v$) on input of a key k and an attribute value v outputs a ciphertext c.
- $tk_Q$←RPE-Token(k, Q) on input of key k and range Q outputs range token $tk_Q$.
- $\{0,1\}$←RPE-Dec($tk_Q$, c) on input of range token $tk_Q$ and ciphertext c=RPE-Enc(k, $v$) outputs 1 if v∈Q and 0 otherwise.

In view of the example RPE scheme, a scheme for range queries with linear runtime (in the number of indexed elements) can be provided. That is, all attributes are encrypted using RPE-Enc and added to the point list $\mathbb{P}$. For every range query of range Q a token $\tau_Q$ is created by the data owner holding the master key using RPE-Token, which is transmitted to the server. The server can provide $ID_Q$ by adding all entries c∈$\mathbb{P}$ with RPE-Dec($tk_Q$, c)=1. In some examples, all entries are checked. Consequently, runtime is linear in the number of all indexed files (ciphertexts).

In some implementations, the search index is structured (e.g., all indexed messages are arranged) in a manner to increase average search speed. Furthermore, the index structure is designed to leak as little information as possible. For all ciphertexts, security can be defined using the following example security game.

Definition 2: RPE is a scheme for range predicate encryption. The following example security game between attacker $\mathcal{A}$ and a challenger includes:
- Init: $\mathcal{A}$ submits two values $v_0$, $v_1 \subset [0, D-1]$ where it wishes to be challenged.
- Setup: The challenger generates a secret key mk by running RPE-Setup($1^\lambda$, [0, D−1]).
- Query Phase 1: $\mathcal{A}$ adaptively issues queries, where each query is one of two types:
  (a) Token query: On the i-th query, $Q_i \subset [0, D-1]$ is submitted satisfying the condition that either ($v_0 \notin Q_i \wedge v_1 \notin Q_i$) or ($v_0 \in Q_i \wedge v_1 \in Q_i$) The challenger generates a token by running $\tau_{Q_i} \leftarrow$ RPE-Token(mk, $Q_i$) and outputs $\tau_{Q_i}$.
  (b) Ciphertext query: On the i-th query, value point $z_i$ is submitted. The challenger encrypts value point $z_i$ by running RPE-Enc(mk, $z_i$) and returns the output.

Challenge: The challenger flips a coin b←{0,1} and outputs RPE-Enc(mk, $v_b$).

Query Phase 2: $\mathcal{A}$ adaptively issues further queries with the same restrictions as in Query Phase 1.

Guess: $\mathcal{A}$ outputs a guess b' of b.

In some examples, RPE has selective secure plaintext privacy, if, for all probabilistic polynomial-time attackers $\mathcal{A}$ running this security game, it holds that $$\left| Pr[b = b'] - \frac{1}{2} \right| \leq \varepsilon;$$

where $\in$ is negligible in λ.

Definition 3: RPE is a scheme for range predicate encryption. The following example security game between attacker $\mathcal{A}$ and a challenger includes:
  Init: $\mathcal{A}$ submits two ranges $R_0, R_1 \subset [0, D-1]$ where it wishes to be challenged.
  Setup: The challenger generates a secret key mk by running RPE-Setup($1^\lambda$, [0, D-1]).
  Query Phase 1: $\mathcal{A}$ adaptively issues queries, where each query is one of two types:
    (a) Token query: On the i-th query, $Q_i \subset [0, D-1]$ is submitted. The challenger generates a token by running $T_{Q_i} \leftarrow$ RPE-Token (mk, $Q_i$) and outputs $\tau_{Q_i}$.
    (b) Ciphertext query: On the i-th query, value point $z_i$ is submitted such that $z_i \in R_0 \wedge z_i \in R_1$ or $z_i \notin R_0 \wedge z_i \notin R_1$. The challenger encrypts value point $z_i$ by running RPE-Enc(mk, $z_i$) and returns the output.
  Challenge: The challenger flips a coin b←{0,1} and outputs RPE-Token (mk, $R_b$).
  Query Phase 2: $\mathcal{A}$ adaptively issues further queries with the same restrictions as in Query Phase 1.
  Guess: $\mathcal{A}$ outputs a guess b' of b.

In some examples, RPE has selective secure predicate privacy, if, for all probabilistic polynomial-time attackers $\mathcal{A}$ running this security game, it holds that $$\left| Pr[b = b'] - \frac{1}{2} \right| \leq \varepsilon;$$

where $\in$ is negligible in λ.

Given such an RPE scheme, a scheme for range queries with linear runtime (in the number of indexed elements) can be provided. That is, all attributes are encrypted using RPE-Enc and added to the point list $\mathbb{P}$. For every range query of range Q a token $\tau_Q$ is created by the data owner holding the master key using RPE-Token. Given this token, the server can create $ID_Q$ by adding all entries $c \in \mathbb{P}$ with RPE-Dec($tk_Q$, c)=1. Because all entries are checked, runtime is linear in the number of all indexed files.

In some examples, to increase average search speed, all indexed messages are arranged in a suitable index structure. Furthermore, the index structure is designed to leak as little information as possible. Given a SRQ scheme for secure and efficient range queries, the encryption operation is extended in way, such that it is possible to encrypt a file $f$ indexed under a value point $v$. As a result, the security game for plaintext privacy is slightly modified to provide the following:

Definition 4: SRQ scheme is a scheme for secure and efficient range queries. The following example security game between attacker $\mathcal{A}$ and a challenger includes:
  Init: $\mathcal{A}$ submits two values $v_0, v_1 \in [0, D-1]$ where it wishes to be challenged.
  Setup: The challenger generates a secret key mk by running SRQ-Setup($1^\lambda$, [0, D-1]).
  Query Phase 1: $\mathcal{A}$ adaptively issues queries, where each query is one of two types:
    (a) Token query: On the i-th query, $Q_i \subset [0, D-1]$ is submitted satisfying the condition that either ($v_0 \notin Q_i \wedge v_1 \notin Q_i$) or ($v_0 \in Q_i \wedge v_1 \in Q_i$). The challenger generates a token by running $T_{Q_i} \leftarrow$ SRQ-Token(mk,$Q_i$) and outputs $\tau_{Q_i}$.
    (b) Ciphertext query: On the i-th query, value $z_i$ and file $f_i$ is submitted. The challenger encrypts $f_i$ indexed under $z_i$ by running SRQ-Enc(mk, ($f_i, z_i$)) and returns the output.
  Challenge: $\mathcal{A}$ submits two equally sized files $f_0, f_1$. The challenger flips a random coin b←{0,1} and outputs SRQ-Enc(mk, ($f_b, v_b$)).
  Query Phase 2: $\mathcal{A}$ adaptively issues further queries with the same restrictions as in Query Phase 1.
  Guess: $\mathcal{A}$ outputs a guess b' of b.

In some examples, SRQ has selective secure plaintext privacy, if, for all probabilistic polynomial-time attackers $\mathcal{A}$ running this security game, it holds that $$\left| Pr[b = b'] - \frac{1}{2} \right| \leq \varepsilon;$$

where ε is negligible in λ.

Regarding predicate privacy, implementations of the present disclosure use properties given directly from RPE predicate privacy. Using these definitions and resulting properties, a security definition for the SRQ scheme of the present disclosure can be provided. In some examples, security properties are defined using a leakage based definition.

Definition 5: Given a scheme for secure range queries SRQ=(SRQ-Setup, SRQ-Enc, SRQ-IndexFile, SRQ-Token, SRQ-Search) and security parameter $\lambda \in \mathbb{N}$, the following probabilistic experiments with an adversary $\mathcal{A}$, a simulator $\mathcal{S}$ and leakage functions $\mathcal{L}_1, \mathcal{L}_2$ are provided:

Real$_\mathcal{A}$(λ): the challenger runs SRQ-Setup ($1^\lambda$, [0, D-1]) to generate a master key and an empty search index γ. First the adversary sends an $f$-tuple of messages M=($m_1, \ldots, m_f$) where $m_i$=($f_i, v_i$) with $v_i \in [0, D-1]$ and $f_i$ is a file for all $i \in \{0, \ldots, f\}$ and a q-tuple of queries Q=($Q_1, \ldots, Q_q$) with $Q_i \subset [0, D-1]$ for all $i \in \{1, \ldots, q\}$ to the challenger. The challenger returns an $f$-tuple C=(SRQ-Enc(mk, $m_1$), ..., SRQ-Enc(mk, $m_f$)) together with a q-tuple of search tokens TK=(SRQ-Token(mk, $Q_1$), ..., (SRQ-Token(mk, $Q_q$)) to the adversary. Finally, $\mathcal{A}$ returns a bit b that is output by the experiment.

Idea$_{\mathcal{A},\mathcal{S}}$(λ): the simulator sets up its internal environment for domain [0, D-1]. The adversary $\mathcal{A}$ sends an $f$-tuple of messages M=($m_1, \ldots, m_f$) where $m_i$=($f_i, v_i$), $v_i \in [0, D-1]$ and $f_i$ is a file for all $i \in \{0, \ldots, f\}$ and a q-tuple Q=($Q_1, \ldots, Q_q$) with $Q_i \subset [0, D-1]$ for all $i \in \{1, \ldots, q\}$ and the simulator is given the appropriate leakage $\mathcal{L}_1$(M) for message tuple and $\mathcal{L}_2$ (Q) for query tuple. Simulator $\mathcal{S}$ returns an $f$-tuple $\tilde{C}$ and a q-tuple $\widetilde{TK}$ to the adversary. Finally, $\mathcal{A}$ returns a bit b that is output by the experiment.

In some examples, the SRQ scheme is ($\mathcal{L}_1$ (M), $\mathcal{L}_2$ (Q))-secure against non-adaptive chosen-range attacks, if, for all probabilistic polynomial-time algorithms $\mathcal{A}$ there exists a probabilistic polynomial-time simulator $\mathcal{S}$ so that advantage of $\mathcal{A}$ defined as:

$$|Pr[\text{Real}_{\mathcal{A}}^{l}(1^\lambda)=1]-Pr[\text{Ideal}_{\mathcal{A},\mathcal{S}}^{l}(1^\lambda))=1]|$$

is negligible in $\lambda$.

In accordance with implementations of the present disclosure, the server uses information gained from previous range queries to reduce the number of files for executing future queries. In this manner, search time is decreased. For further discussion, it can be assumed that the server (cloud service provider) has learned a range token $\tau_Q$ and its result set $ID_Q$ after performing a scan over the complete set of indexed messages. Given a new range token $\tau_R$ with $R \subset Q$ scanning result set $ID_Q$ (that is a subset of the complete set of indexed values) suffices to obtain $ID_R$. Furthermore, the server can compute the result set for the relative complement of R in Q (i.e., $ID_{Q\setminus R}$). This information can also be used for responding more quickly to queries in the future.

In some implementations, in order to increase average search speed, all indexed messages are arranged in the search index in a suitable manner, and the search index is updatable efficiently. Furthermore, structure of the search index is designed to leak as little information as possible. In accordance with implementations of the present disclosure, the search index is organized into multiple components:
1. A tree list denoted as $\mathbb{T}$ is a list of search trees, each search tree covering one coherent and already searched range. This enables the server to answer range queries that are subranges of already queried ranges in logarithmic time.
2. A point list denoted as $\mathbb{P}$ is a linear list of all indexed points. This enables the server to answer all range queries that are neither a subrange of an already queried range nor have been searched before. Checking all elements for falling within the queried range has linear runtime.

Figure 2:
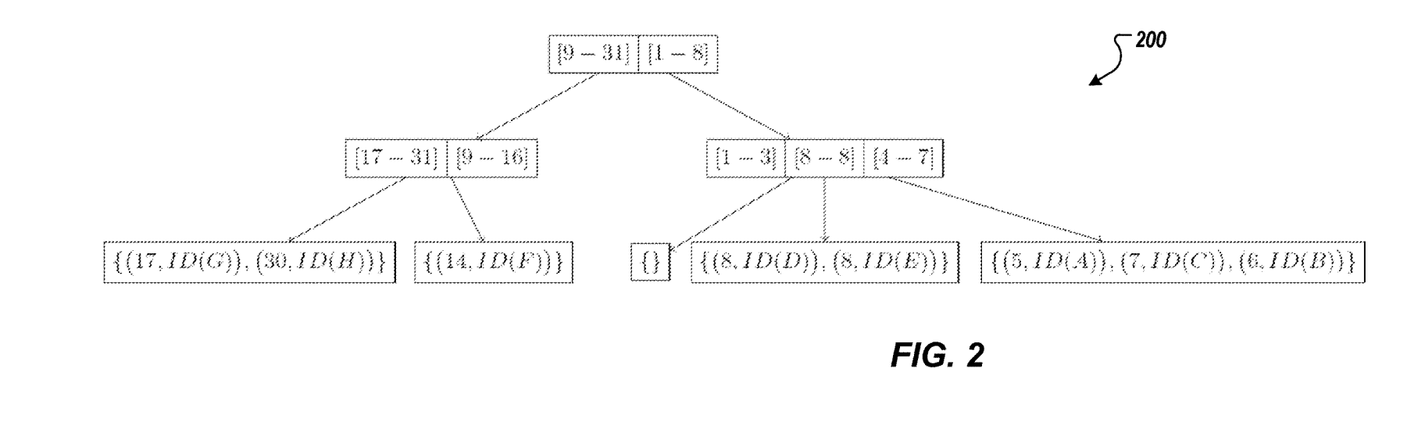
FIG. 2 depicts an example search tree in accordance with implementations of the present disclosure.

Within the tree list $\mathbb{T}$, encrypted (1-dimensional) R-trees are stored. In some examples, an R-tree $\Gamma$ completely covers a coherent range. Each inner node includes up to t entries. FIG. 2 depicts an example tree 200 with t=3 covering range [1-31] and indexed messages A, . . . , H. In some examples, each entry has the form (p, R), where R is a range and p is a pointer to another node (either an inner node or a leaf) covering this range. Accordingly, the pointer p points to a subtree. In some examples, $\Gamma[p]$ is denoted as a subtree of $\Gamma$ pointed to by p. For simplicity, $\Gamma \subset S$ for a range S, if the covered range of $\Gamma$ is a subset of S, and vice versa $S \subset \Gamma$.

Further, for any two entries $(p_1, R_1)$ and $(p_2, R_2)$ of the same node, it holds that $R_1 \cap R_2 = \emptyset$ (i.e., the ranges in one node do not overlap). For every entry (p, R), it holds that the subtree rooted at the node pointed to by p covers range R (i.e., $\Gamma[p]=R$). Furthermore, all leafs consist of up to t entries, and each entry has the form (obj, R), where R is a range and obj is a pointer to a list of all files indexed under values $v \in R$ (i.e., obj points to $ID_R$). Given a range $Q=[q^{(s)}, q^{(e)}]$, the server holding a tree F covering a superset of Q (i.e. $Q \subset \Gamma$) can calculate $ID_Q$ by using Algorithm 1 in logarithmic time (in the number of nodes):

---

Algorithm 1: Tree Search for Range Queries (SearchForRange)

---

SearchForRange
Input: Tree Γ, Range Q
Output: $ID_Q$
Initialize temporary result list L;
for all $e_i = (p_i, R_i)$ in root of Γ do
  if $R_i \subseteq Q$ then
    Add all values indexed by $\Gamma[p_i]$ to L
  end
  if $q^{(s)} \in R_i$ or $q^{(e)} \in R_i$ then
    if $p_i$ points to another node then
      Add output of SearchForRange ($\Gamma[p_i]$, Q) to L
    end
    if $p_i$ points to a list $ID_{R_i}$ then
      Add all values with $v \in Q$
    end
  end
end
return list L

---

In some examples, the only two operations needed for such a range query are the following: first, checking if start point $q^{(s)}$ and end point $q^{(e)}$ of Q falls within range R (i.e., if R and Q intersect), and second, checking if range Q is a subrange of range R. In some examples, this functionality is provided by a modified RPE scheme. Consequently, a range query can also be answered over search trees that include ranges encrypted by the modified RPE scheme. In some examples, a range token for range Q created by RPE-Token must be augmented with encrypted limiting points (that is start and end point) encrypted using RPE-Enc.

In some examples, in order to add new values to an existing tree, the correct leaf and entry must be identified. That is, the entry that contains the range the new value(s) falls within. In some examples, this can be done using Algorithm 2:

---

Algorithm 2: Searching an Entry for Specific Value (SearchEntry)

---

SearchEntry
Input: Tree Γ and value point $v$
Output: Entry e = (obj, R) with $v \in R$.
if No entry e = (p, R) in root exists with $v \in R$ then
  Return ⊥
end
Set current node n to root;
while n is not a leaf do
  Search in node n for entry e = (p, R) with $v \in R$;
  Set n to the node p points to;
end
Search in leaf n for entry e = (obj, R) so that $v \in R$;
Return e.

---

In some implementations, using the encrypted index structure, an SRQ scheme can be defined as described in the following. Given an RPE scheme including the algorithms RPE-Setup, RPE-Enc, RPE-Token, RPE-Dec, an (IND-CPA) secure encryption scheme $\Pi_1=(\text{Gen}^{IND-CPA}, \text{Enc}^{IND-CPA}, \text{Dec}^{IND-CPA})$ and a second encryption scheme $\Pi_2=(\text{Gen, Enc, Dec})$, an SRQ scheme is provided as follows:
  mk, γ←SRQ-Setup($1^\lambda$, [0, D−1]) on input of security parameter and value domain [0, D−1] use $k_1$←RPE-Setup($1^\lambda$, [0, D−1]) and $k_2$←Gen$^{IND-CPA}(1^\lambda)$ and $k_3$←Gen($1^\lambda$); set mk=($k_1$, $k_2$, $k_3$). Output master key mk.
  c←SRQ-Enc(mk, m): on input of master key mk=($k_1$, $k_2$, $k_3$) and message m=(f, $v$) do the following:
    Encrypt $c_1$←RPE-Enc($k_1$, $v$).
    Encrypt $c_2$←Enc$^{IND-CPA}(k_2, f)$.

Output $c=(c_1, c_2)$.

$\gamma, C \leftarrow$ SRQ-IndexFile $((ID(m_i), c_i))_{i \in [1,n]}$): Initialize an empty search index $\gamma$ that contains an empty point list $\mathbb{P}$, an empty tree list $\mathbb{T}$ and an empty ciphertext collection $C$. For each $i \in [1, n]$ parse $c_i=(c_{i1}, c_{i2})$ and add tuple $(ID(m_i), c_{i2})$ to $C$. Furthermore, add tuple $(ID(m_i), c_{i1})$ to point list $\mathbb{P}$. Output $C$ and $\gamma$.

$\tau_Q \leftarrow$ SRQ-Token(mk, Q): on input of master key mk=$(k_1, k_2, k_3)$ and range $Q=[q^{(s)}, q^{(e)}]$, use RPE-Enc for encrypting $c_Q^{(s)}$=RPE-Enc$(k_1, q^{(s)})$ and $c_Q^{(e)}$=RPE-Enc$(k_1, q^{(e)})$. Furthermore create range token tk$_Q$=RPE-Token$(k_1, Q)$. In addition, encrypt $Q$ to $c_Q$=Enc$(k_3, Q)$ to enable the client to decrypt this range token. Output $\tau_Q=(c_Q^{(s)}, c_Q^{(e)}, tk_Q, c_Q)$ as range token.

$ID_Q \leftarrow$ SRQ-Search$(\tau_Q, \gamma)$ given range token $\tau_Q=(c_Q^{(s)}, c_Q^{(e)}, tk_Q, c_Q)$ for range $Q$ and index $\gamma$, check for all index trees in $\mathbb{T}$, if they cover the queried values completely or partly. Initialize a list $\widehat{\mathbb{T}} = \{\Gamma_i | \Gamma_i \subseteq Q\}$ of trees that lie completely in the queried range $Q$. Then do the following for the boundary points $c_Q^{(s)}$ and $c_Q^{(e)}$:

(a) Check if there exists one tree $\Gamma_i \in \mathbb{T}$ containing $c_Q^{(s)}$ and $c_Q^{(e)}$. If this is the case, get $ID_Q$ by calling Algorithm 1 and set $\Gamma^{(s)}=\Gamma^{(e)}=\Gamma_i$.

(b) Otherwise, check if there exists a tree covering the queried range partly. In more detail, set tree $\Gamma^{(s)} \in \mathbb{T}$ with $c_Q^{(s)} \in \Gamma^{(s)}$ and $\Gamma^{(s)}=\perp$ otherwise. Do the same with $c_Q^{(e)}$ and $\Gamma^{(e)}$.

(c) Else set $\Gamma^{(s)}=\Gamma^{(e)}=\perp$.

If case 1 does not occur, scan all ciphertexts $(ID_{f_i}, c_i) \in \mathbb{P}$ using RPE-Dec$(tk_Q, c_i)=r_i$ and store $ID_{f_i}$ in the result set $ID_Q$ iff $r_i=1$. In order to maintain logarithmic search time for future queries that are a subrange of already queried ranges, call an interactive procedure SQR-UpdateIndex$(\tau_Q, ID_Q, \Gamma^{(s)}, \Gamma^{(e)}, \widehat{\mathbb{T}})$ (described above). Output $ID_Q$ as result.

Using the above-described algorithms, it is possible to outsource encrypted data, and support range queries. For example, in an initial step the data owner creates a master key by calling SRQ-Setup and defines a possible value domain. The data owner encrypts files by calling SRQ-Enc, where every file is associated with one value point and indexed under this point. The encrypted file is transferred to the server and added to the search index by calling SRQ-IndexFile. In some examples, the files (e.g., encrypted files) can be deleted on the client side. The data owner holding the master key can create search tokens for ranges by calling SRQ-Token. In some examples, the server can compare different range tokens without knowing the master key. More specifically, holding two tokens $\tau_Q=(c_Q^{(s)}, c_Q^{(e)}, tk_Q, c_Q)$ and $\tau_R=(c_R^{(s)}, c_R^{(e)}, tk_R, c_R)$ the server is able to check for the following example properties:

1. $R$ and $Q$ intersect, if RPE-Dec$(tk_Q, c_R^{(s)})=1$, or if RPE-Dec$(tk_R, c_Q^{(e)})=1$.
2. $R$ is a subrange of $Q$, if RPE-Dec$(tk_Q, c_R^{(s)})=1$ and RPE-Dec$(tk_Q, c_R^{(e)})=1$.
3. Ranges are equal, if $R$ is a subrange of $Q$, and $Q$ is a subrange of $R$.

Figure 3:
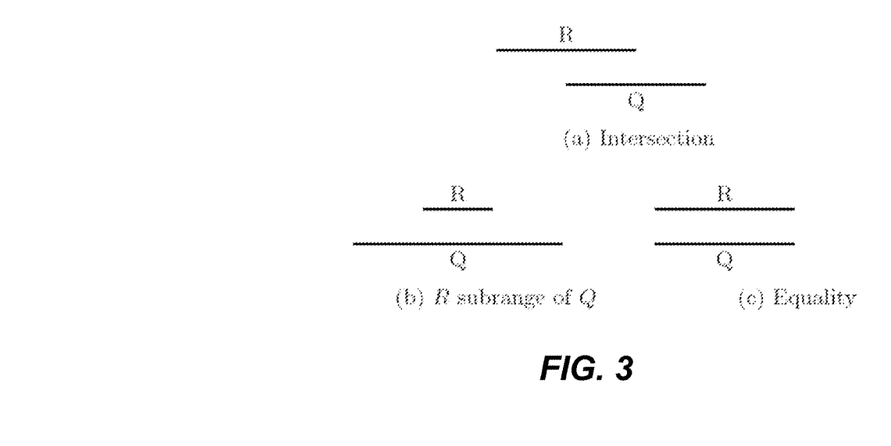
FIG. 3 depicts example relationships between ranges.

FIG. 3 depicts example relationships between ranges.

In some implementations, the server receiving a range token $\tau_Q=(c_Q^{(s)}, c_Q^{(e)}, tk_Q, c_Q)$ for range $Q=[q^{(s)}, q^{(e)}]$ can search for all files associated with values falling within the range $Q$ by using SRQ-Search. In an initial step, the server checks, for every tree $\Gamma_i \in \mathbb{T}$, if the tree covers a subrange of $Q$ or intersects with range $Q$. For example, all entries $((p_1, \tau_{R_1}), \ldots, (p_{m_i}, \tau_{Rm_i}))$ contained in the root node of any tree $\Gamma_i$ are compared with range $Q$, where $\Gamma_i$ covers a subrange, if all ranges $R_1, \ldots, R_{m_i}$ are subranges of $Q$, and $\Gamma_i$ intersects with $Q$, if there exists at least one range $R_j$ that intersects with range $Q$. A list $\widehat{\mathbb{T}} = \{\Gamma_i | \Gamma_i \subset Q\}$ of all trees that cover a subrange of $Q$ is created. In some examples, partial intersections of indexed search trees and the queried range are computed. In some examples, $\Gamma^{(s)}$ is the tree containing range $\hat{R}$ covering $c_Q^{(s)}$ (i.e., $\hat{R} \in \Gamma^{(s)}$ so that RPE-Dec$(\hat{R}, c_Q^{(0)})=1$). If no such tree was found, set $\Gamma^{(s)}=\perp$. The same is done for the encrypted end value $c_Q^{(e)}$, which results in a tree $\Gamma^{(e)} \in \mathbb{T}$ and $\Gamma^{(e)}=\perp$ otherwise.

There are multiple scenarios that can happen for a given range token $\tau_Q$. Each scenario results in different behavior of SQR-UpdateIndex described herein. Example scenarios include:

1. One tree covers the complete queried range $Q$, that is $\Gamma^{(s)}=\Gamma^{(e)}$, so $Q \subset F$. If this is the case, the server does not need to perform a search over the complete point list $\mathbb{P}$, but searching over the value points indexed by $\Gamma^{(s)}$ is sufficient. This is done by Algorithm 1 described above. SQR-UpdateIndex refines indexed ranges by using new information gained from the current range query.

2. No intersection of the current range query and previously queried ranges, so $\Gamma^{(s)}=\Gamma^{(e)}=\perp$ and $\widehat{\mathbb{T}}=\emptyset$. If this is the case, the server does not know anything about the current range query. As a result, the server has to scan all points indexed in point list $\mathbb{P}$. SQR-UpdateIndex creates a new search tree that is added to tree list $\mathbb{T}$ covering the queried range.

3. Only a part of the queried range is covered by indexed search trees. Either $\Gamma^{(s)}=\perp$ or $\Gamma^{(e)}=\perp$. If this is the case, the server cannot know if there are values in point list $\mathbb{P}$ falling within $Q$, but are not covered by $\Gamma^{(s)}$ resp. $\Gamma^{(e)}$. As a result, the server scans all points indexed in point list $\mathbb{P}$. SQR-UpdateIndex extends the one tree covering the queried range partly (i.e., the tree that is not $\perp$).

4. The values fall within different trees, that is $c^{(s)} \in \Gamma^{(s)}$, $c^{(e)} \in \Gamma^{(e)}$ where $\Gamma^{(s)} \neq \Gamma^{(e)}$. If this is the case, the server cannot be sure that there is no non-indexed gap between the two trees (i.e., there could be values in $\mathbb{P}$ falling neither within $\Gamma^{(s)}$ nor $\Gamma^{(e)}$, but that fall within range $Q$. As a result, the server scans all points indexed in point list $\mathbb{P}$. SQR-UpdateIndex merges these two trees $\Gamma^{(s)}$ and $\Gamma^{(e)}$, because the gap has been closed by the current range query.

From a high-level perspective, a new range token contains some new information given to the server, such as the result set $ID_Q$ for this new range token. This newly gained information is implicit in the search and access pattern, and can be used by the server to update the encrypted search index for future queries. As noted above, given SQR-UpdateIndex $(\tau_Q, ID_Q, \Gamma^{(s)}, \Gamma^{(e)}, \widehat{\mathbb{T}})$, four different update situations can occur, where the server has to either refine one tree, create a new tree, extend one tree, or merge trees. In addition, trees that are covered completely by $Q$ (i.e., contained in $\widehat{\mathbb{T}}$) are composed using a combination of tree extension and tree merges.

Because operations can make it necessary to create new range tokens for encrypted trees, and this creation is only possible with the master key, these updates are interactive protocols between server and data owner. In the continued discussion, actions performed at the client-side are denoted as @c in the algorithms below. This could be necessary, because the operation must be performed on plaintext or the creation of new range tokens is necessary.

Because operations add new entries to one or more existing trees, these operations can include a rebalancing step, discussed herein as Algorithm 3, to guarantee every node's size is lower than threshold t afterwards. Again, rebalancing a tree forces the creation of new range tokens, so this is also provided as an interactive protocol.

---
Algorithm 3: Rebalancing a Tree (RebalanceTree)
---

RebalanceTree
Input: Tree $\Gamma$, modified leaf l
Output: Rebalanced tree $\Gamma'$
Set cur_node = l;
while cur_node > t do
    Send all $e_i = (p_i, \tau_{R_i})$ of cur_node to client;
    @C: Sort $\{e_i\}$ according to $R_i$, create two tokens $\tau_U, \tau_V$
    where $U = \cup_{i=0}^{(\frac{n}{2})-1} R_i$, $V = \cup_{i=(\frac{n}{2})}^{n} R_i$ and set nodes $N_U = \{e_i | R_i \subseteq U\}$, $N_V = \{e_i | R_i \subseteq V\}$;
    @C: Send back $N_V, N_U, \tau_V, \tau_U$ to server
    if cur_node is not root then
        Replace cur_node with $L_V, L_U$ indexed with tokens $\tau_V, \tau_U$
        in parent of cur_node;
        Set cur_node to parent of ;
    end
    else
        Replace cur_node with $L_V, L_U$;
        Create new root consisting of tokens $\tau_V, \tau_U$ pointing to $L_V, L_U$;
    end
end

---

With regard to refining a tree, the server sends the new range token and previous range tokens that intersect with this new token to the data owner asking for help. The data owner decrypts the range tokens creates (up to) four not intersecting, but more refined ranges and sends back their tokens generated by SRQ-Token. The server can replace the old range tokens with the new, more refined tokens and the indexed file lists are segmented according to these new tokens. Algorithm 4 provides a formal description. Because this replacement increases the entries in a node, the server runs RebalanceTree.

---
Algorithm 4: Refining Tree (RefineTree)
---

RefineTree
Input: Tree $\Gamma$, token $\tau_Q$
Output: Refined Tree $\tilde{\Gamma}$
for $q \in \{q^{(s)}, q^{(e)}\}$ do
    Set leaf to leaf containing
    (obj, $\tau_R$) = SearchEntry($\Gamma$, q);
    Send $\tau_R$ and $\tau_Q$ to the client
        @C: Calculate $Q_1 = R \cap Q$ and $Q_2 = R \setminus Q$
        @C: Send back $\tau_{Q_1}, \tau_{Q_2} \leftarrow$ SQR - Token
    Divide the list $ID_Q$ that is pointed to by obj into new
    lists $ID_{Q_1}, ID_{Q_2}$ covering $Q_1$ resp. $Q_2$;
    In leaf replace (obj, $\tau_R$) with two new entries
    $(obj_1, \tau Q_1)$ $(obj_2, \tau_{Q_2})$;
    RebalanceTree ($\Gamma$, leaf) ;
end

---

In some implementations, if $\Gamma^{(s)} = \Gamma^{(e)} = \bot$ and $\mathbb{T}$ is empty, the server creates a new tree. In some examples, the server creates a new, encrypted tree $\Gamma$ with one entry $\tau_Q$ and indexed item $ID_Q$. This tree $\Gamma$ is added to tree list $\mathbb{T}$.

In some implementations, a tree is extended, if a new range token intersects partially with a tree (i.e., the range token intersects with the tree), but at least one limiting point of this newly queried range does not. In some examples, extending a tree is started by the server sending the newly learned range token and the root node to the data owner. The data owner decrypts all ranges to reconstruct the whole range currently covered by this tree. A new range token for the gap between the range covered by the tree and the boundary points of the new range token lying outside the tree range is created and added to the tree's leaf. Furthermore, the tree's inner nodes (up to the root) are updated. That is, the indexed range of all inner nodes are replaced by an extended version. Algorithm 5 provides a formal description. In some examples, because at least one leaf got a new entry, the resulting tree is rebalanced after tree extension.

---
Algorithm 5: Extend Tree with New Range (ExtendTree)
---

ExtendTree
Input: Tree $\Gamma$, extension token $\tau_Q$ (intersecting with at least one range in the tree) .
Output: Updated tree $\Gamma$ now also covering $\tau_Q$ completely.
Send root node n and token $\tau_Q$ to client
    @C: Given entries $(p_i, R_i) \in$ n set $[r_1, r_2] = R = \cup_i R_i$
for $i \in \{1, 2\}$ do
    @C: Ask server for node-set $N_i = \{n_j | r_i \in n_j\}$
    for $n_j \in N_i$ do
        @C: Set $\tau_{R'}$ to token with lowest resp. greatest range $R' = [r'^{(s)}, r'^{(e)}]$
        if $n_j$ is not a leaf then
            @C: Create new token $\tau_{Q'i}$ where $Q'_1 = [q^{(s)}, r'(e)]$ resp. $Q'_2 = [r'^{(s)}, q^{(e)}]$
            Replace $\tau_{R'}$ with $\tau_{Q'i}$
        end
        else
            @C: Create new token $\tau_{Q'i}$ where
            $Q'_1 = [q^{(s)}, r^{(s)} - 1]$ resp.
            $Q'_2 = [r^{(e)} + 1, q^{(e)}]$
            Add new entry $(\tau_{Q'i}, ID_{Q'i})$ to $n_j$;
            Set leaf = $n_j$
        end
    end
    RebalanceTree ($\Gamma$, leaf) ;
end

---

In some implementations, two trees are merged, if they both intersect with the newly queried range. In some examples, these two trees should not have a value gap between them. In some implementations, the end point covered by one tree is directly followed by the start point covered by the other tree. This can be achieved using tree extension as discussed above. In some examples, to merge trees in logarithmic time, the tree $\tilde{\Gamma}$ is integrated with the lower height into the tree $\Gamma$ with greater height. A new entry in an inner node of $\Gamma$ is created pointing to the root of $\tilde{\Gamma}$. This newly covered range is propagated through the inner nodes up to the root. Algorithm 6 provides a formal description. In some examples, the resulting tree is rebalanced.

---
Algorithm 6: Merging Trees (MergeTrees)
---

MergeTrees
Input: Two trees $\Gamma_1, \Gamma_2$.
Output: One merged tree.
Set $\Gamma \in \{\Gamma_1, \Gamma_2\}$ to higher tree with height h and $\tilde{\Gamma} \in \{\Gamma_1, \Gamma_2\}$ to
lower tree with height $\tilde{h}$;
Send the root of both trees $\Gamma, \tilde{\Gamma}$ covering R resp. $\tilde{R}$ to client
    @C: if $r^{(s)} > \tilde{r}^{(s)}$ then
        @C: Set $v = r^{(s)}$
    end
    else
        @C: Set $v = r^{(e)}$;
    end Algorithm 6: Merging Trees (MergeTrees)

@C: Send back $\tau_{\tilde{R}}$ and $c_v \leftarrow$ RPE - Enc(k, $v$);
Set i = h and cur_node to root of $\Gamma$;
while i > $\tilde{h}$ do
    Send entry $e_i = (p_i, \tau_{R_i})$ in cur_node with $v \in R_i$ and $\tau_{\tilde{R}}$
    to client
    @C: Send back token $\tau_U$ with $U = R_i \cup \tilde{R}$;
    In entry $e_i$ replace $\tau_{R_i}$ with $T_U$;
    Set cur_node to node pointed to by $p_i$;
end
Insert entry $(\tilde{p}, \tau_{\tilde{R}})$ in cur_node, where $\tilde{p}$ points to tree $\tilde{\Gamma}$
RebalanceTree ($\tilde{\Gamma}$, cur_node)

In some implementations, if a range token has been queried where multiple trees fall within, tree extension and tree merging can be combined. In some examples, all roots in $\mathbb{T}$, $\Gamma^{(s)}$, $\Gamma^{(e)}$ and the newly queried range token $\tau_Q$ are sent to the client. The client decrypts all roots and gets ranges $R_i = [r_i^{(s)}, r_i^{(e)}]$ covered by tree $\Gamma_i$, sorted according to their range start point $r_i^{(s)}$. The client chooses two trees $\Gamma_j$, $\Gamma_{j+1}$ that are to be merged. In some examples, it can be assumed that $\Gamma_j$ has greater height. Consequently, $\Gamma_j$ is extended to cover $[r_j^{(s)}, r_{j+1}^{(s)}-1]$ using Algorithm 5. Subsequently, $\Gamma_j$ and $\Gamma_{j+1}$ can be merged using Algorithm 6, and the number of different trees is reduced by one. This is done repeatedly until exactly one search tree is left covering the complete queried range.

Implementations of the present disclosure are described in further detail herein with reference to an example runtime (e.g., execution). As a starting point in the example runtime, it is assumed that a range has not been queried multiple times so far. As a result, every token contains new information the server can use for updating index $\gamma$. Given a value domain with D elements and n indexed items, there exist $$\sum_{i=0}^{D} i = \frac{D+D^2}{2} = O(D^2)$$

different coherent ranges that can be queried. In some examples, after $D^2$ different queries, all possible ranges have been queried and $\gamma$ includes of exactly one tree containing all possible ranges.

In this state, any repeated range query can be answered in logarithmic time. However, assuming that there are repeated queries before the search index $\gamma$ contains exactly one tree, such repeated queries may raise problems. Furthermore, these repeated queries do not contain new information, so the server is not able to update index $\gamma$. As a result, there are search patterns that result in linear search time: First, O(n) different, not coherent ranges are queried and indexed $$\left(\text{e.g., } \frac{n}{2} \text{ different queries-each of size 1}\right).$$

Now these ranges are repeatedly queried—in average half of all indexed queries are checked before an answer is provided.

In accordance with implementations of the present disclosure, a cache is used for already queried ranges. In this manner, the search time for such cases is reduced. In some examples, using a hash table keyed with deterministic range identifiers (e.g., $\Pi_2 =$ (Gen, Enc, Dec) is a deterministic encryption that is part of every search token), the search time is reduced for repeated range queries to constant time O(1).

The runtime for one search operation is the sum of the actual search time $t_s$ and the update time $t_u$. The height of the tree is bound by log(D) and the size of an operation on one predicate-encrypted ciphertext is also O(log(D)). Consequently, merging two trees, extending one tree, refining one tree or rebalancing one tree can be done in O(log$^2$(D)), and r trees can be merged in O(r·log$^2$ (D)). Furthermore, because any update operation adds at least one new boundary element, there can be at most n trees. As a result, the expected update time is bounded by $t_u = O(n \cdot \log^2 (D))$.

In some implementations, search time depends on the newly queried range Q (i.e., if the newly queried range Q is completely covered by exactly one tree). The probability of this is denoted by $Pr[Q \subseteq \Gamma_i]$. If this is the case, search can be performed in O(log$^2$(D)), because searching one tree is sufficient for learning the result set. Otherwise, the complete point list is scanned and potentially updated, resulting in search time of O(n log$^2$(D)). As a result, the expected search time can be provided as:

$$t_s = Pr[Q \subseteq \Gamma_i] \cdot O(\log^2(D)) + (1 - Pr[Q \subseteq \Gamma_i]) \cdot O(n \log^2(D)).$$

In some examples, any time a range is not completely covered by a single tree, at least one element in D is added to a search tree. Accordingly, the size of the set $\Gamma_i$ increases by at least 1. Consequently, a search complexity of O(n log$^2$ (D)) is conducted n times at most. The maximum total time spent for these searches is n·n log$^2$ (D). In some examples, this time can be amortized over the events $Q \subseteq \Gamma_i$. In some examples, x is the total number of searches until amortization occurs, where:

$$\frac{n \cdot n \log^2(D)}{x} = \log^2(D)$$

In accordance with implementations of the present disclosure, after n$^2$ searches, at the latest, poly-logarithmic search time is achieved on average.

Security of the SRQ-scheme of the present disclosure is described in further detail with respect to the security of encrypted files using SRQ-Enc, and the security of tokenized queries using SRQ-Token. The following example theorem is provided:

Theorem 1: If the used scheme RPE=(RPE-Setup, RPE-Enc, RPE-Token, RPE-Dec) has selectively secure plaintext privacy, and $\Pi_1 =$ (Gen$^{IND\text{-}CPA}$, Enc$^{IND\text{-}CPA}$, Dec$^{IND\text{-}CPA}$) is an IND-CPA secure encryption scheme, then the SRQ-scheme of the present disclosure has selectively secure plaintext privacy.

Proof: The security game described above ($\mathbb{G}_0$ of Definition 4) is modified to show the computational indistinguishability of the original game and the modified game ($\mathbb{G}_1$). This modified game is as follows: the only step the challenger does not perform as in the original game is the challenge step. Instead, in the modified security game, the challenger responds $c = (c_1, c_2)$, where $c_1 =$ RPE-Enc (mk$_1$, $v_b$) and $c_2 =$ Enc$^{IND\text{-}CPA}$(mk$_2$, $0^{|f_b|}$). An attacker $\mathcal{B}_0$ bis provided reaking IND-CPA security using distinguisher $\mathcal{D}$ between $\mathbb{G}_0$ and $\mathbb{G}_1$. $\mathcal{B}_0$ gets two values $v_0$, $v_1$ and creates a key mk$_1 =$ RPE-Setup ($1^\lambda$, [0, D–1]). All token queries of $\mathcal{D}$ are answered directly by $\mathcal{B}_0$ using RPE-Token and mk$_1$. For all ciphertext queries ($z_i$, $f_i$) sent by the distinguisher, $\mathcal{B}_0$ asks its encryption oracle for an (Enc$^{IND\text{-}CPA}$) encryption $c_2$ of $f_i$, creates $c_1 =$ RPE-Enc ($mk_1$, $z_i$), and sends $c=(c_1, c_2)$ to $\mathcal{D}$. On challenge ($t_0$, $f_0$) and ($t_1, f_1$) sent by the distinguisher, $\mathcal{B}_0$ flips a coin $b \leftarrow \{0,1\}$, creates $c_1$=RPE-Enc($mk_1$, $t_b$) and submits $f_b$ and $0^{|f_b|}$ to its challenger for the IND-CPA game. The challenger on the IND-CPA game flips a bit $b^* \leftarrow \{0,1\}$ and sends back $c^*$, where $c^*$=Enc$^{IND\text{-}CPA}$($mk_2$, $f_b$) if $b^*$=0 and $c^*$=Enc$^{IND\text{-}CPA}$($mk_2$, $0^{|f_b|}$) if $b^*$=1. $\mathcal{B}_0$ sends ($c_1$, $c^*$) to $\mathcal{A}$. If $b^*$=0 the view of $\mathcal{D}$ is the same as in $\mathbb{G}_0$, if $b^*$=1 the view is the same as in $\mathbb{G}_1$. Consequently, due to IND-CPA security of $\Pi$, the probability of differentiating $\mathbb{G}_0$ and $\mathbb{G}_1$ is negligible.

An attacker $\mathcal{B}_1$ can be provided on range predicate only encryption plaintext privacy of the used RPE scheme using an attacker $\mathcal{A}$ that wins $\mathbb{G}_1$ with probability $\in$. $\mathcal{B}_1$ gets two values $v_0$, $v_1$ output by $\mathcal{A}$ and creates a key $mk_2$=Gen$^{IND\text{-}CPA}$($1^\lambda$). $\mathcal{B}_1$ wishes to be challenged on these values $v_0$, $v_1$, and thus outputs them to the challenger and sends back the answers. In the query phases, $\mathcal{B}_1$ forwards all token queries of $\mathcal{A}$ to its own challenger. For all ciphertext queries ($z_i$, $f_i$) $\mathcal{B}_1$ creates $c_2$=Enc$^{IND\text{-}CPA}$($mk_2$, $f_i$), asks its own challenger for $c_1$=RPE-Enc($mk_1$, $z_i$), and sends back $c$=($c_1$, $c_2$). On challenge with files $f_0$, $f_1$, $\mathcal{B}_1$ asks its own challenger for a challenge (i.e., the challenger flips a coin $b^*$ and sends $c^*$=RPE-Enc($mk_1$, $v_{b^*}$) to $\mathcal{B}_1$. $\mathcal{B}_1$ creates $\tilde{c}_2$=Enc$^{IND\text{-}CPA}$($mk_2$, $0^{|f_0|}$) and sends the tuple ($c^*$, $\tilde{c}_2$) to $\mathcal{A}$. The guess $b$ output by $\mathcal{A}$ is also returned by $\mathcal{B}_1$. It is clear that the probability of $\mathcal{B}_1$ winning the range predicate game is the same as the probability of $\mathcal{A}$ winning $\mathbb{G}_1$, which is negligible. Therefore, the advantage of $\mathcal{A}$ winning $\mathbb{G}_0$ is also negligible.

Before a security proof according Definition 5 is provided, example leakage functions $\mathcal{L}_1$, $\mathcal{L}_2$ are defined as follows:

$$\mathcal{L}_1(M)=((ID(m_i),\text{len}(f_i)))_{i \in [1,f]}$$

$$\mathcal{L}_2(Q)=(ID_Q=(ID_{Q_1},\ldots,ID_{Q_q}),RR(Q))$$

where $RR(Q)$ is a $q \times q$ range relation matrix, each element is in the set $\{\emptyset, \cap, =, \subset, \subset^=, \supset, \supset^=\}$. Here an element in row $i$ and column $j$ indicates the relation of ranges $Q_i$ and $Q_j$ given in queries $i$ and $j$. $\emptyset$ denotes no intersection, $=$ denotes the equality of two ranges, $\cap$ denotes a intersection but no range is a subrange of the other. $\subset$ denotes that range $Q_i$ is a subset of $Q_j$ but no limiting points are in common, $\subset^=$ denotes a subset relation with one limiting point in common, and the other way round $\supset$ denotes that range $Q_i$ is a superset of $Q_j$, i.e., if $\subset$ is at position (i, j) than $\supset$ is at position (j, i).

In Definition 4 above, the challenger only accepts challenges $v_0$, $v_1$ that both occur in the same subset of the access pattern. For example, if file $f_i$ indexed under $v_i$ is in $ID_{Q_i}$, it holds that $f_{1-i}$ indexed under $v_{1-i}$ is also in $ID_{Q_i}$ for $i \in \{0,1\}$ and all token queries. Otherwise it would be trivial for attacker $\mathcal{A}$ to win the security game.

In some examples, these restrictions are removed by giving the simulator access to this information in the form of the access pattern and the range relation matrix. This can be used to show security of a real protocol run, where fulfilling the restrictions of the security games cannot be guaranteed. On the other hand, given two range token sequences with the same range relation matrix (for their ranges), no attacker can distinguish between these range token sequences.

Theorem 2: Given SRQ that is built upon a RPE-scheme with selective secure plaintext privacy and selective secure predicate privacy, a domain [0, D–1], two query sequences ($Q_1, \ldots, Q_n$)=$Q \neq R$=($R_1, \ldots, R_n$) with $Q_i \subset$ [0, D–1], $R_i \subset$ [0, D–1] and $RR(Q)$=$RR(R)$, the probability for any $mk \leftarrow$ SRQ-Setup($1^\lambda$, [0, D–1]), $TK_Q$=(SRQ-Token ($mk$, $q_1$), ..., SRQ-Token($mk$, $q_n$)) and $TK_R$=(SRQ-Token ($mk$, $r_1$), ..., SRQ-Token($mk$, $r_n$)), provided as:

$$|Pr[\mathcal{A}(TK_Q)=1]-Pr[\mathcal{A}(TK_R)=1]|$$

is negligible for any distinguisher $\mathcal{A}$.

Proof: Denote $\epsilon_\Pi$ as the probability of an attacker $\mathcal{A}$ breaking the used IND-CPA secure encryption scheme, denote $\epsilon_1$ as the probability of an attacker $\mathcal{A}$ winning the RPE-plaintext privacy security game, and $\epsilon_2$ as the probability of an attacker $\mathcal{A}$ winning the RPE-predicate privacy game. Given negligible $\epsilon_\Pi$, $\epsilon_1$ and $\epsilon_2$ it is possible to extend, shrink and move the ranges, such that the probability of any attacker $\mathcal{A}$ to distinguish between a token $\tau_Q$ and token $\tau_{\tilde{Q}}$ that is a extended, shrunk or moved version of Q is negligible.

First, given a range token $T_Q$=($c_Q^{(0)}$, $c_Q^{(1)}$, $tk_Q$, $c_Q$), it is possible to extend range Q to range $\tilde{Q}$ as long as there is no other range R, for which a token $\tau_R$ is known, with $R \cap Q$=$\emptyset$ but $R \cap \tilde{Q} \neq \emptyset$. In a first step, it can be assumed that no such range R exists. A series of games can be provided to show that the probability of any attacker $\mathcal{A}$ to distinguish two games is negligible.

In $\mathbb{G}_0$, the original token $\tau_Q$ is given.

In $\mathbb{G}_1$, replace $c_Q$ with a new encryption $c_{\tilde{Q}}$=Enc$^{IND\text{-}CPA}$($\tilde{Q}$). Attacker $\mathcal{A}$ can distinguish between $\mathbb{G}_0$ and $\mathbb{G}_1$ with probability $\epsilon_\Pi$.

In $\mathbb{G}_2$, replace $tk_Q$ with a new RPE-token $tk_{\tilde{Q}}$=RPE-Token($\tilde{Q}$). Note, that $q^{(s)} \in \tilde{Q}$ and $q^{(e)} \in \tilde{Q}$ still holds. Hence, attacker $\mathcal{A}$ can distinguish between $\mathbb{G}_1$ and $\mathbb{G}_2$ with probability $\epsilon_2$.

In $\mathbb{G}_3$, move the limiting point $c_Q^{(i)}$ that encrypts $q^{(e)}$: Replace $c_Q^{(i)}$=RPE-Enc($q^{(e)}$) with $\widetilde{c_Q^{(i)}}$=RPE-Enc($\widetilde{q^{(e)}}$). Attacker $\mathcal{A}$ can distinguish between $\mathbb{G}_2$ and $\mathbb{G}_3$ with probability $\epsilon_1$.

After $\mathbb{G}_3$, a valid token $\tau_{\tilde{Q}}$ is provided for the new range $\tilde{Q}$. Putting it altogether, attacker $\mathcal{A}$ can distinguish between these tokens with probability:

$$\tilde{\epsilon}=\epsilon_\Pi+\epsilon_2+\epsilon_1$$

Shrinking a range Q to a range $\tilde{Q}$ can be done in a similar way, as long as there is no other range R, for which token $\tau_R$ is known, with $R \cap Q \neq \emptyset$ but $R \cap \tilde{Q}$=$\emptyset$. In some examples, $\mathbb{G}_3$ and $\mathbb{G}_2$ are swapped. As a result, attacker $\mathcal{A}$ can distinguish between a token $\tau_Q$ and a token for a shrunk range $\tau_{\tilde{Q}}$ with probability:

$$\epsilon_\Pi+\epsilon_1+\epsilon_2=\tilde{\epsilon}$$

Combining these techniques, a range Q=[$q^{(s)}$, $q^{(e)}$] can move to a new range $\tilde{Q}$=[$q^{(s)}$+x, $q^{(e)}$+x], as long as there is no other range R with $r^{(s)}$>$q^{(s)}$ but $r^{(s)}$<($q^{(e)}$+x) (otherwise, this range R must be moved before). First, extend Q to a range Q'=[$q^{(s)}$, $q^{(e)}$+x], then shrink Q' to range $\tilde{Q}$=[$q^{(s)}$+x, $q^{(e)}$+x].

Without loss of generality, it can be assumed that $\max_{Q_i \in Q}(q_i^{(e)})<\max_{R_i \in R}(r_i^{(e)})$. The token for $Q_i$ is extended with the greatest limiting point $q_i^{(e)}$ to a token for range [$q_i^{(s)}$, $r_i^{(e)}$] (using the techniques described above). Repeating this technique for all ranges in descending order of their end point, the complete range sequence Q is modified to an extended range sequence Q' with the same end points as R. All ranges in the extend range sequence Q' are shrunk to be identical to range sequence R. As shown before, an attacker can distinguish each of these extending and shrink modifications with probability $\tilde{\epsilon}$, which is negligible. Consequently, a combination of polynomial many modifications is still negligible.

Given this theorem, the security of SRQ-scheme of the present disclosure can be more formal defined using leakage based Definition 5, provided above.

Theorem 3: If the SRQ-scheme has selective secure plaintext privacy based on an RPE-scheme with selective secure predicate privacy and $\Pi_1$ is an IND-CPA secure encryption scheme, then the SRQ-scheme is ($\mathcal{L}_1$, $\mathcal{L}_2$)-secure against non-adaptive chosen-range attacks.

Proof: A PPT simulator $\mathcal{S}$ is provided, for which the advantage of any PPT adversary $\mathcal{A}$ to distinguish between the Real$_{\mathcal{A}}$ and Ideal$_{\mathcal{A},\mathcal{S}}$ experiments from Definition 5 is negligible. For this, $\mathcal{S}$ can be described as setting up the environment and simulating range tokens $\widetilde{TK}$ and ciphertexts $\tilde{C}$ using leakage $\mathcal{L}_1$ and $\mathcal{L}_2$.

Setting up the environment: $\mathcal{S}$ internally runs SRQ-Setup ($1^\lambda$, [0, D−1]) and receives a master key mk.

Simulating $\widetilde{TK}$: $\mathcal{S}$ extracts clusters of ranges that form one big coherent range. Algorithm 7 provides a formal description.

---
Algorithm 7: Extracting Range Clusters
---
Init empty list of lists clusters
Init empty list of used indexes U
while |U| < q, do
  Init two empty lists N, G;
  Add random index from [0, q]\U to N;
  while N not empty do
    choose random row index i from N;
    for 0 < j < q do
      if RR(Q) ≠ 0 and J ∉ U then
        Add j to N;
      end
    end
    Add i to U and G;
    Remove i from N;
  end
  Add G to clusters;
end
return clusters.

---

Each cluster is a separate R-Tree in the implementation described herein. For every cluster, $\mathcal{S}$ simulates ranges with the same range relation matrix as the actual given range relation matrix RR(Q). In more detail, for every cluster, simulator $\mathcal{S}$ transforms the range relation matrix RR (Q) into a linear program that is solved. Every relation is formulated as in equations. Doing this for all clusters, $\mathcal{S}$ gets simulated ranges $\tilde{Q}$ with RR(Q)=RR($\tilde{Q}$). Now $\mathcal{S}$ sets $\widetilde{TK}$=(SRQ-Token(mk, $\tilde{Q}_i$)$_{i\in[1,q]}$) which is indistinguishable by Theorem 2. Note that $\mathcal{S}$ can restore the simulated range $\tilde{Q}_i$ given a range token SRQ-Token (mk, $\tilde{Q}_i$), because a component includes an ordinary IND-CPA encrypted value that can be decrypted.

Simulating $\tilde{C}$: Simulator $\mathcal{S}$ creates a set of leafs L. More particularly, $\mathcal{S}$ divides ID$_Q$ in a set L consisting of disjoint sets, where L covers the same values as ID$_Q$. Two sets ID$_{Q_i}$ and ID$_{Q_j}$ with ID$_{Q_i}$∩ID$_{Q_j}$=ID$_{Q_{ij}}$ are divided in ID$_{Q_i}$\ID$_{Q_{ij}}$, ID$_{Q_j}$\ID$_{Q_{ij}}$ and ID$_{Q_{ij}}$. For every simulated leaf L$_i$∈L, simulator $\mathcal{S}$ stores the indexes of all range queries that contain L$_i$ as result set: L(i)={j|L$_i$⊆ID$_{Q_j}$ ∧ ID$_{Q_j}$∈ID$_Q$}. Given the set L of simulated leafs, $\mathcal{S}$ can simulate the ciphertexts $\tilde{C}$=($\tilde{c}_1$, ..., $\tilde{c}_f$) as follows: $\mathcal{S}$ iterates over all tuples (ID($f_i$), len ($f_i$)) and:

if there is a simulated L$_j$∈L with ID ($f_i$)∈L$_j$, $\mathcal{S}$ sets
    choses randomly a simulated value point $\tilde{v}_t \leftarrow \cap_{k\in L(j)}$ $\tilde{Q}_k$. Now set $\widetilde{c_{t,1}}$=RPE-Enc(mk$_1$, $\tilde{v}$), $\widetilde{c_{t_2}}$=Enc$^{IND\text{-}CPA}$(mk$_2$, $0^{len(f_i)}$) and add tuple $\tilde{c}_t$=($\widetilde{c_{t_1}}$, $\widetilde{c_{t_2}}$) to $\tilde{C}$; or Otherwise, there is no simulated leaf L$_j$∈L with ID ($f_i$)∈L$_j$, the encrypted file has no match with any queried ranges. Then $\mathcal{S}$ sets $\widetilde{c_{t_1}}$=RPE-Enc(mk$_1$, r) with random value outside of all simulated ranges: r←[0, $\tilde{D}$−1]⊂∪$_{i=1}^q \tilde{Q}_i$. Simulator sets $\widetilde{c_{t_2}}$=Enc$^{IND\text{-}CPA}$(mk$_2$, $0^{len(f_i)}$) and adds $\tilde{c}_t$=($\widetilde{c_{t_1}}$, $\widetilde{c_{t_2}}$) to $\tilde{C}$.

Due to IND-CPA security of $\Pi_1$, selective secure plaintext privacy of SRQ and Theorem 2, the probability for $\mathcal{A}$ to distinguish between C and $\tilde{C}$ generated by $\mathcal{S}$ is negligible.

It is possible for $\mathcal{S}$ to simulate range queries $\tilde{Q}$ from given leakage $\mathcal{L}_2$ (Q). Simulator $\mathcal{S}$ is able to simulate all update protocols on these tokens $\widetilde{TK}$. Because decrypting range token $\tau \tilde{Q}_i$ is possible for the simulator, $\mathcal{S}$ can run all update queries on the simulated ranges $\tilde{Q}$. Note that these update protocols do not contain new information, but all information is already covered by $\mathcal{L}_1$(M) and $\mathcal{L}_2$(Q).

Figure 4:
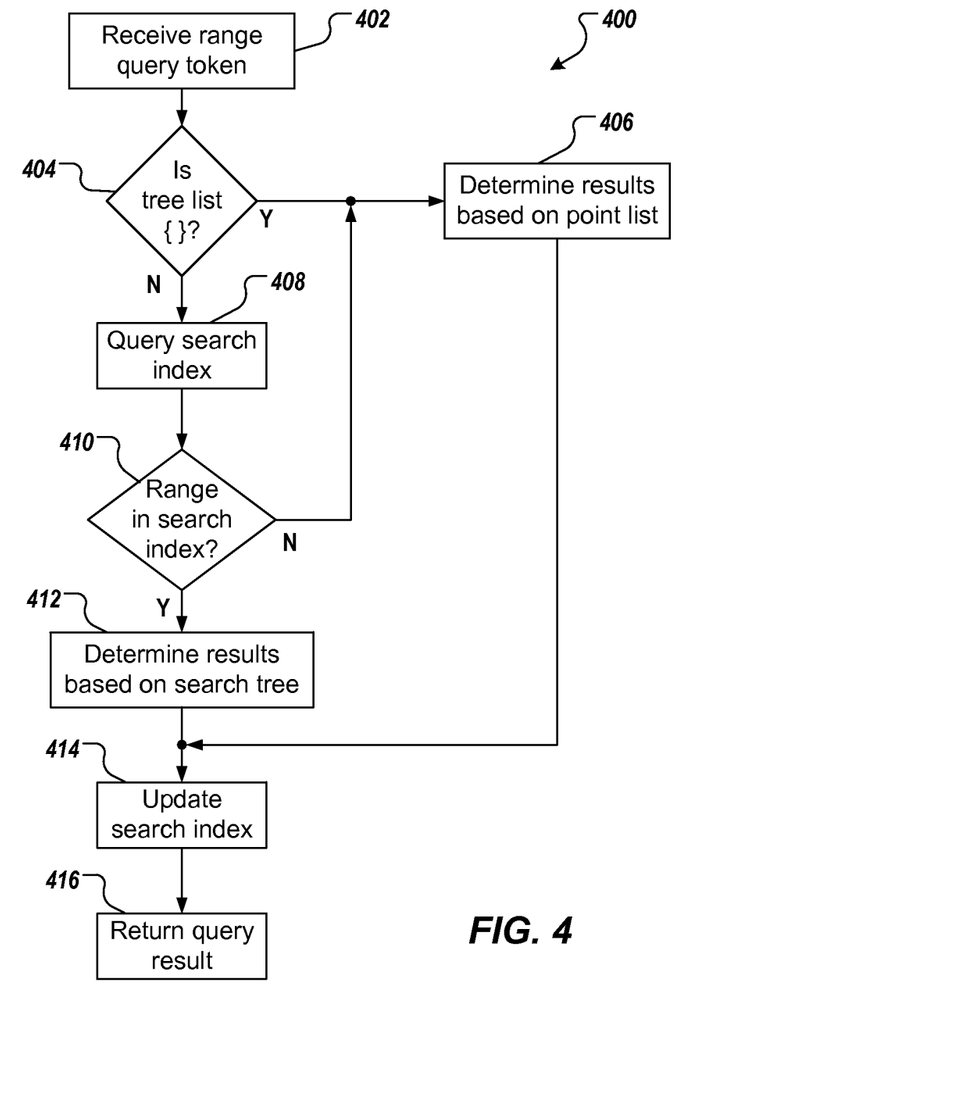
FIG. 4 depicts an example process that can be executed in accordance with implementations of the present disclosure.

FIG. 4 depicts an example process 400 that can be executed in accordance with implementations of the present disclosure. In some examples, the example process 400 can be provided as one or more computer-executable programs executed using one or more computing devices. In some implementations, the example process 400 is executed to perform range queries over encrypted data in accordance with implementations of the present disclosure.

A range query token is received (402). For example, a range query token is received by a server-side computing device from a client-side computing device. In some examples, the range query token is encrypted. It is determined whether a tree list is empty (404). In some examples, an encrypted search index stored at the server-side includes the tree list and a point list. In some examples, the tree list is empty, if the tree list does not include at least one search tree. In some examples, a search tree is associated with an already searched range (e.g., a range resulting from a previously submitted range query token). In some examples, the point list includes a list of indexed points of ciphertext that is to be searched based on received queries (e.g., range queries). If the tree list is empty, an encrypted query result is determined based on the point list (406). For example, the server-side computing device queries the encrypted data (ciphertext) based on indexed points provided in the point list to provide the encrypted query result (e.g., a range).

If the tree list is not empty, it is determined whether the range query token corresponds to a previously submitted range query token of a search tree in the tree list (410). In some examples, if the range query token is a sub-range of, or is equal to a previously submitted range query token of a search tree in the tree list, it is determined that the range query token corresponds to the range query token of the search tree in the tree list. In some examples, if the range query token does not intersect a previously submitted range query token of a search tree in the tree list, the range query token only partially intersects a previously submitted range query token of a search tree in the tree list, or values of the range query token correspond to values of multiple search trees in the tree list, it is determined that the range query token does not correspond to a range of a search tree in the tree list.

If it is determined that the range query token does not correspond to a range of a search tree in the tree list, an encrypted query result is determined based on the point list (406). If it is determined that the range query token does correspond to a range of a search tree in the tree list, an encrypted query result is determined based on a search tree (412). For example, the encrypted query result is based on value points indexed by the search tree.

The encrypted search index is updated (414). In some examples, the encrypted search index is updated based on the range query token and a client-server protocol. In some examples, the encrypted search index is updated by adding a search tree to the tree list, refining a search tree (e.g., Algorithm 4), extending a search tree (e.g., Algorithm 5), merging search trees (e.g., Algorithm 6), and/or rebalancing a search tree (Algorithm 3). Encrypted query results are returned (416). For example, the server-side computing device transmits the encrypted query results to the client-side computing device.

Figure 5:
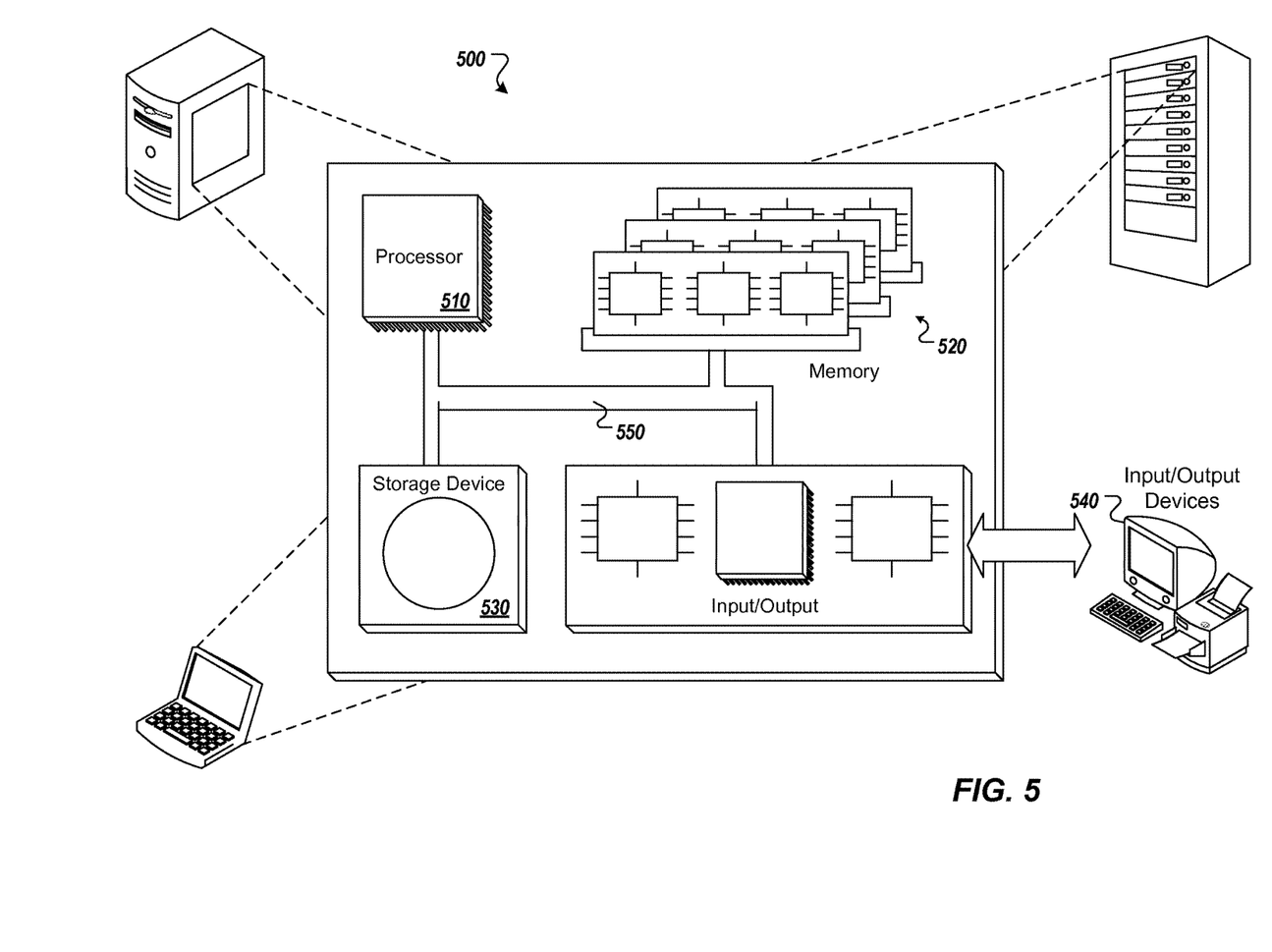
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for performing range queries over encrypted data, the method being executed by a server-side computing device and comprising:

receiving, by the server-side computing device, a range query token from a client-side computing device;

determining, by the server-side computing device, one or more of whether a tree list of an encrypted search index is empty and a range of the range query token is intersecting with a range accounted by at least one tree in the tree list, the at least one tree covering an already searched range, the encrypted search index comprising the tree list and a point list, the point list comprising one or more pointers, each pointer pointing to one of a node of a sub-tree within the encrypted search index, and a query result set;

receiving, by the server-side computing device, encrypted query results based on one of a search tree, if the tree list is not empty and a range of the range query token is at least a sub-range of a range accounted for in the tree list, and a pointer of the point list, if the tree list is empty or the range of the range query token is not at least a sub-range of a range accounted for in the tree list; and in response to receiving the range query token, updating, by the server-side computing device, the encrypted search index based on the range query token to change one of the tree list to represent that the range of the range query token has been searched, and at least one indexed range, updating comprising executing a client-server protocol comprising actions performed by the server-side computing device and actions performed by the client-side computing device on plaintext data provided from encrypted data that is received from the server-side computing device, and using a master key held by the client-side computing device.

2. The method of claim 1, wherein updating the encrypted search index comprises refining a search tree of the tree list at least partially based on transmitting the range query token and a previously received range query token to the client-side computing device, and receiving refined range tokens from the client-side computing device, the encrypted search index being updated based on the refined range tokens.

3. The method of claim 1, wherein updating the encrypted search index comprises extending a search tree of the tree list to provide an extended search tree at least partially based on transmitting a root node of the search tree and a previously received query corresponding to the search tree to the client-side computing device to provide a new range query token corresponding to the extended search tree.

4. The method of claim 1, wherein updating the encrypted search index comprises merging multiple search trees of the tree list to provide a merged search tree at least partially based on transmitting respective root nodes of the multiple search trees to the client-side computing device, and receiving a revised token corresponding to the merged search tree.

5. The method of claim 4, wherein the multiple trees are merged in response to determining that there is no value gap between the multiple trees.

6. The method of claim 1, further comprising receiving the encrypted search index and ciphertext from the client-side computing device.

7. The method of claim 1, wherein the tree list comprises at least one search tree based on a previously received range query token.

8. A non-transitory computer-readable storage medium coupled to one or more processors and having instructions stored thereon which, when executed by the one or more processors, cause the one or more processors to perform operations for performing range queries over encrypted data, the operations comprising:

receiving, by a server-side computing device, a range query token from a client-side computing device;

determining, by the server-side computing device, one or more of whether a tree list of an encrypted search index is empty and a range of the range query token is intersecting with a range accounted by at least one tree in the tree list, the at least one tree covering an already searched range, the encrypted search index comprising the tree list and a point list, the point list comprising one or more pointers, each pointer pointing to one of a node of a sub-tree within the encrypted search index, and a query result set;

receiving, by the server-side computing device, encrypted query results based on one of a search tree, if the tree list is not empty and a range of the range query token is at least a sub-range of a range accounted for in the tree list, and a pointer of the point list, if the tree list is empty or the range of the range query token is not at least a sub-range of a range accounted for in the tree list the point list, if the tree list is empty or the range of the range query token is not at least a sub-range of a range accounted for in the tree list; and in response to receiving the range query token, updating, by the server-side computing device, the encrypted search index based on the range query token to change one of the tree list to represent that the range of the range query token has been searched, and at least one indexed range, updating comprising executing a client-server protocol comprising actions performed by the server-side computing device and actions performed by the client-side computing device on plaintext data provided from encrypted data that is received from the server-side computing device, and using a master key held by the client-side computing device.

9. The computer-readable storage medium of claim 8, wherein updating the encrypted search index comprises refining a search tree of the tree list at least partially based on transmitting the range query token and a previously received range query token to the client-side computing device, and receiving refined range tokens from the client-side computing device, the encrypted search index being updated based on the refined range tokens.

10. The computer-readable storage medium of claim 8, wherein updating the encrypted search index comprises extending a search tree of the tree list to provide an extended search tree at least partially based on transmitting a root node of the search tree and a previously received query corresponding to the search tree to the client-side computing device to provide a new range query token corresponding to the extended search tree.

11. The computer-readable storage medium of claim 8, wherein updating the encrypted search index comprises merging multiple search trees of the tree list to provide a merged search tree at least partially based on transmitting respective root nodes of the multiple search trees to the client-side computing device, and receiving a revised token corresponding to the merged search tree.

12. The computer-readable storage medium of claim 11, wherein the multiple trees are merged in response to determining that there is no value gap between the multiple trees.

13. The computer-readable storage medium of claim 8, wherein operations further comprise receiving the encrypted search index and ciphertext from the client-side computing device.

14. The computer-readable storage medium of claim 8, wherein the tree list comprises at least one search tree based on a previously received range query token.

15. A system, comprising:
a server-side computing device; and
a computer-readable storage device coupled to the server-side computing device and having instructions stored thereon which, when executed by the server-side computing device, cause the server-side computing device to perform operations for performing range queries over encrypted data, the operations comprising:
receiving a range query token from a client-side computing device;
determining one or more of whether a tree list of an encrypted search index is empty and a range of the range query token is intersecting with a range accounted by at least one tree in the tree list, the at least one tree covering an already searched range, the encrypted search index comprising the tree list and a point list, the point list comprising one or more pointers, each pointer pointing to one of a node of a sub-tree within the encrypted search index, and a query result set;
receiving, by the server-side computing device, encrypted query results based on one of a search tree, if the tree list is not empty and a range of the range query token is at least a sub-range of a range accounted for in the tree list, and a pointer of the point list, if the tree list is empty or the range of the range query token is not at least a sub-range of a range accounted for in the tree list the point list, if the tree list is empty or the range of the range query token is not at least a sub-range of a range accounted for in the tree list; and
in response to receiving the range query token, updating, by the server-side computing device, the encrypted search index based on the range query token to change one of the tree list to represent that the range of the range query token has been searched, and at least one indexed range, updating comprising executing a client-server protocol comprising actions performed by the server-side computing device and actions performed by the client-side computing device on plaintext data provided from encrypted data that is received from the server-side computing device, and using a master key held by the client-side computing device.

16. The system of claim 15, wherein updating the encrypted search index comprises refining a search tree of the tree list at least partially based on transmitting the range query token and a previously received range query token to the client-side computing device, and receiving refined range tokens from the client-side computing device, the encrypted search index being updated based on the refined range tokens.

17. The system of claim 15, wherein updating the encrypted search index comprises extending a search tree of the tree list to provide an extended search tree at least partially based on transmitting a root node of the search tree and a previously received query corresponding to the search tree to the client-side computing device to provide a new range query token corresponding to the extended search tree.

18. The system of claim 15, wherein updating the encrypted search index comprises merging multiple search trees of the tree list to provide a merged search tree at least partially based on transmitting respective root nodes of the multiple search trees to the client-side computing device, and receiving a revised token corresponding to the merged search tree.

19. The system of claim 18, wherein the multiple trees are merged in response to determining that there is no value gap between the multiple trees.

20. The system of claim 15, wherein operations further comprise receiving the encrypted search index and ciphertext from the client-side computing device.

* * * * *